(12) United States Patent
Smith

(10) Patent No.: US 6,757,008 B1
(45) Date of Patent: Jun. 29, 2004

(54) VIDEO SURVEILLANCE SYSTEM

(75) Inventor: Steven W. Smith, Poway, CA (US)

(73) Assignee: Spectrum San Diego, Inc., San Diego, CA (US)

( * ) Notice: Subject to any disclaimer, the term of this patent is extended or adjusted under 35 U.S.C. 154(b) by 827 days.

(21) Appl. No.: 09/669,692

(22) Filed: Sep. 26, 2000

Related U.S. Application Data

(60) Provisional application No. 60/156,556, filed on Sep. 29, 1999.

(51) Int. Cl.[7] .......................... H04N 7/18; H04N 5/225; G06K 9/00
(52) U.S. Cl. ...................... 348/143; 348/169; 382/103
(58) Field of Search ................ 348/143, 144, 348/145, 146, 153, 157, 169, 166, 201, 202; 382/103; 280/236; 356/612

(56) References Cited

U.S. PATENT DOCUMENTS 4,947,039 A * 8/1990 Lawson et al. ............. 250/236
5,278,632 A * 1/1994 Shotwell ..................... 356/612
5,657,077 A * 8/1997 DeAngelis et al. ......... 348/157
6,014,163 A * 1/2000 Houskeeper ................. 348/47
6,542,183 B1 * 4/2003 DeAngelis et al. ......... 348/157
6,545,705 B1 * 4/2003 Sigel et al. ................. 348/157

* cited by examiner

Primary Examiner—Gims Philippe

(57) ABSTRACT

A linescan camera is used in conjunction with a mechanical scanning mechanism to acquire high-resolution images of an area under video surveillance. The video signal from the linescan camera is converted into a digital data stream, compressed, and stored in a digital memory. Under control of an operator, full-field images are selectively recalled from the digital memory and converted to a lower resolution for display on a monitor. The operator selects a region-of-interest from the full-field display through the use of a computer pointing device, such as a mouse. The selected area is then displayed on the monitor in its full acquired resolution, thereby allowing the operator to view high-resolution images of a large area under surveillance.

40 Claims, 9 Drawing Sheets

160 pixels/ft.

80 pixels/ft.

40 pixels/ft.

20 pixels/ft.

VIDEO SURVEILLANCE SYSTEM

This application claims the benefit of Provisional Application no. 60/156,556 filed Sep. 29, 1999.

BACKGROUND OF THE INVENTION

This Invention relates to the acquisition and display of a sequence of images, and particularly to video cameras and recorders used to document criminal activity and other events occurring in a monitored area.

Prior art video surveillance equipment, commonly called Closed Circuit Television (CCTV), acquires and stores a surveillance record in the same format as used in broadcast television. This is an analog signal with a frame rate of 30 images per second, with each image containing 480 lines, and with a bandwidth sufficient to provide approximately 640 resolvable elements per line. As is known in the art, this is comparable to a digital video signal operating with a frame rate of 30 images per second, and with each image containing 640 by 480 pixels. For this reason and to facilitate a comparison between analog and digital video signals, the prior art CCTV format will hereafter be referred to as containing 640 by 480 pixels per image. That is, in the context of analog video signals, the term "pixel" is used to mean a "resolvable element as limited by the signal bandwidth." In the context of digital video signals, the term "pixel" has its usual meaning as known in the art.

While this prior art format is well matched to the needs of broadcast television, it is inefficient for surveillance use. The goal of surveillance video is to document the events that occur in an area. To fully achieve this goal, a video surveillance system must be able to record information that allows such tasks as: (1) identifying previously unknown persons by their facial features and body marks, such as tattoos and scars; (2) identifying automobiles by reading their license plates, recognizing their make and model, and recording distinguishing marks such as body damage; and (3) monitoring the actions of person's hands, such as the exchange of illicit drugs and money, the brandishing of weapons, and the manipulation or removal of property.

All these tasks require a spatial image resolution of approximately 80 pixels-per-foot, or greater. That is, the pixel size must be equal to, or small than, about 0.15 by 0.15 inches. Prior art systems operating with 640 by 480 pixel images can only achieve this minimally acceptable resolution when the field-of-view is set to be 8 by 6 feet, or smaller (i.e., in the horizontal direction: 640 pixels/8 ft.=80 pixels/ft.; in the vertical direction: 480 pixels/6 ft.=80 pixels/ft.). However, this maximum field-of-view for optimal operation is much smaller than typical locations that need to be monitored by surveillance video. For example, the lobby of a building might be 20 to 80 feet across, while a parking lot might be hundreds of feet in size.

A common approach to this problem is to use multiple cameras with each viewing a different small part of the monitored region. While this provides the needed resolution over the large surveillance area, it requires an excessively large number of cameras. In addition, persons and vehicles moving within the monitored region will be viewed on one camera, then another, then another, and so on. This movement from one video record to another makes it difficult and inconvenient for operators to understand the events in the region as a whole.

Another prior art approach is to pan the image acquisition. This is carried out by mechanically rotating the camera such that a relatively small field-of-view is repositioned to observe different areas within the larger region being monitored. Panning can be automatic, such as a mechanism that moves the camera back-and-forth each ten to twenty seconds, or under the manual control of an operator. However, panning has the disadvantage that only a small part of the monitored region is viewed at any one time. Events that transpire in other portions of the monitored region are completely missed. Manual panning has the additional disadvantage of being an inefficient use of costly and limited manpower.

Another common prior art approach is to simply ignore the need for adequate resolution, and set the camera to view the entire large area being monitored. However, this results in the video record having too poor of spatial resolution for identifying faces, vehicle license plates, actions of the hands, and so on. In addition, much of the recorded video is wasted because the fixed 4:3 aspect ratio (640 pixels wide by 480 pixels high) does not match the much larger aspect ratio of typical monitored areas. For example, it might be desired to monitor a 40 foot wide by 10 foot high building lobby, an area with an aspect ratio of 4:1. However, when a single camera with a fixed aspect ratio of 4:3 is adjusted for a 40 foot wide field-of-view, the height of the viewed area will be 30 feet, wasting two-thirds of the image.

Prior art CCTV systems also waste data storage by acquiring video at a frame rate of 30 images per second. This frame rate is needed in broadcast television to give the viewer the impression of smooth motion. However, this smooth motion is not needed to accomplish the key tasks of surveillance video. Recognizing persons, reading license plates, and identifying hand actions are primarily accomplished by inspecting individual frames of the video sequence. Since only small changes can occur in $\frac{1}{30}$th of a second, acquiring data at 30 images per second produces redundant data that must be stored and analyzed.

Another disadvantage of the prior art is that the video information remains in analog form throughout its use, from acquisition, to storage on magnetic tape, to being displayed on a television monitor. This makes the recorded information susceptible to degradation from long-term storage, stray magnetic fields, and signal-to-noise deterioration from repeated use of the magnetic tape. In addition, analog signals cannot be compressed by removing the correlation been adjacent pixels of the same image, or pixels at the same location in sequential images. This inefficient data representation results in the need for a large storage capacity. Analog video is also limited because it cannot be transmitted over digital communication channels, such as the internet. In addition, only very simple signal processing techniques can be directly applied to analog signals, such as adjustment of the brightness and contrast. Advanced signal processing techniques, such as convolution and Fourier domain manipulation, cannot be used to improve the image quality of prior art systems because of their analog nature. The playback of analog video is likewise limited to only a few simple techniques, such as normal play, fast forward, and reverse. Advanced playback functions such as image zoom (enlargement of a smaller area) are not available, making it difficult for operators reviewing the recorded video to extract the important information.

BRIEF SUMMARY OF THE INVENTION

The Invention overcomes these limitations of the prior art by acquiring video data with a large number of pixels per image, typically 5120 by 2048 or greater, and a slow frame rate, typically 15 to 240 images per minute. This video acquisition is achieved through the use of a linescan camera viewing a vertical line in the monitored area, in conjunction with a mechanical scanning assembly for repeatedly sweeping the viewed line in the horizontal direction. The resulting video data stream is compressed using MPEG or a similar algorithm, and stored in a large-capacity digital memory. Through the use of an operator interface, images contained in the recorded video can be recalled from memory, uncompressed, and displayed on a video monitor. Also by use of the operator interface, subsections of individual images can be displayed on the video monitor in an enlarged form.

It is the goal of the Invention to provide an improved method of electronic video surveillance. Another goal of the Invention is to acquire video data in a spatial and temporal format that is matched to the specific needs of video surveillance, rather than broadcast television. It is an additional goal to store and manipulate the surveillance image data in a digital form. A further goal is to provide a spatial image resolution capable of recognizing faces, automobile license plates, actions of the hands, and similar items, while simultaneously monitoring large areas. An additional goal is to provide surveillance image data with an improved signal-to-noise ratio. Another goal is to provide a high aspect-ratio surveillance image that is matched to the area being monitored. Still another goal is to provide an operator interface that facilitates the extraction of relevant subsections of the surveillance record. Yet an additional goal is to facilitate the use of digital image processing to aid in the extraction of information from the surveillance record.

DETAILED DESCRIPTION OF THE INVENTION

Figure 1A:
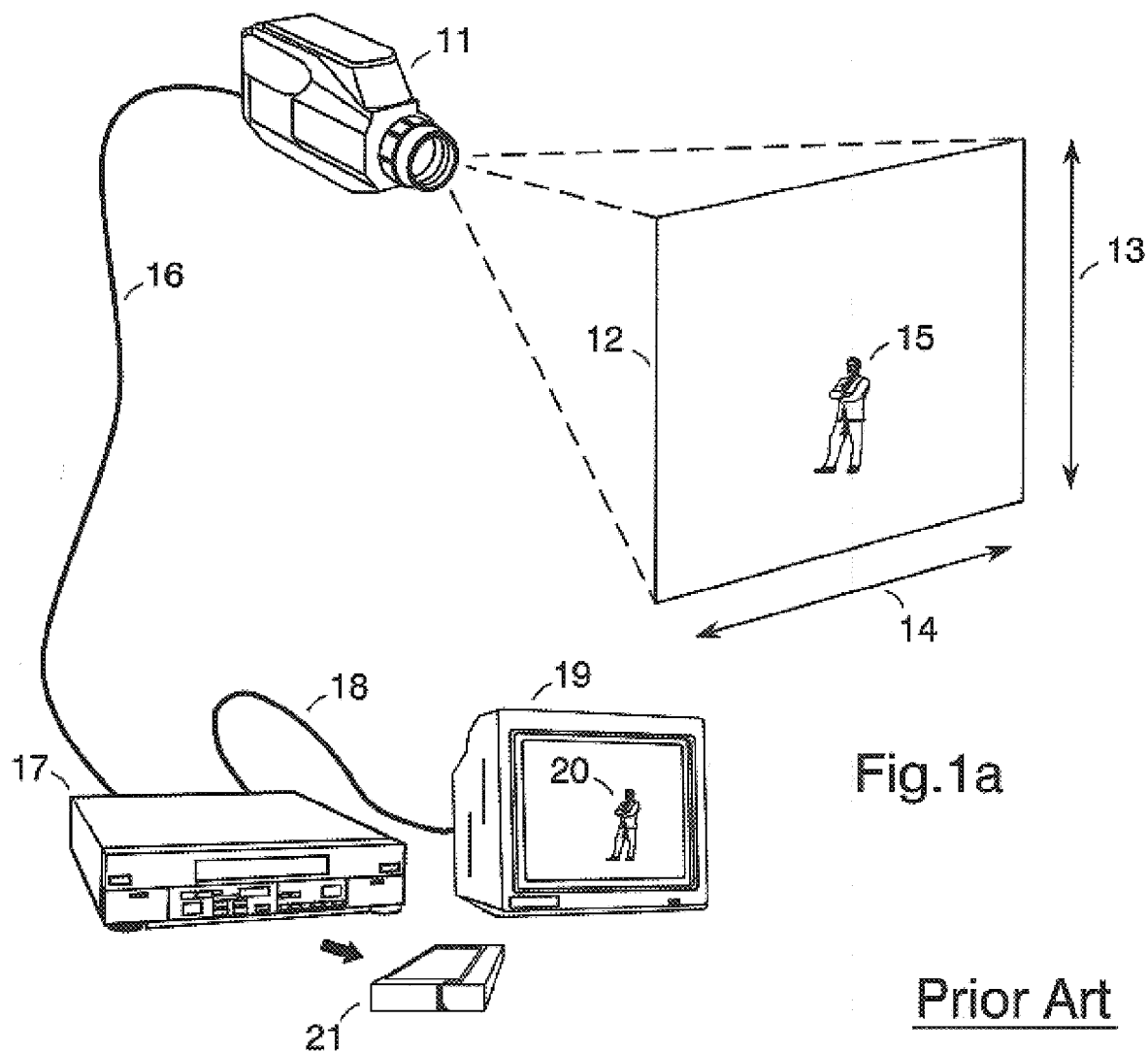
FIG. 1A is a schematic depiction of the prior art CCTV surveillance system.
Figure 1B:
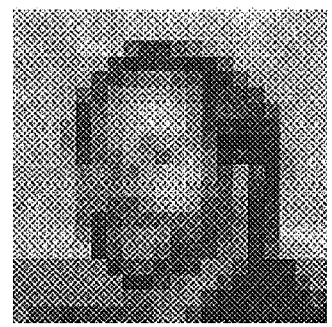
FIGS. 1B and 1C are example images in accordance with the prior art CCTV surveillance system.
Figure 1C:
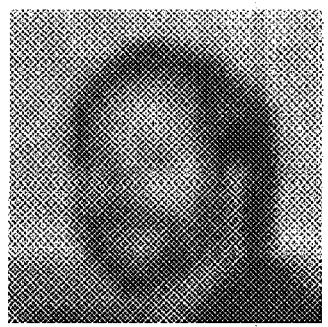

FIG. 1 shows the operation of prior art video surveillance systems. A CCTV camera 11 views an area to be monitored 12 with a height 13 and a width 14, and containing a person 15. The CCTV camera 11 produces an RS-170 video signal 16 of the live action, consisting of 30 images per second, with an equivalent resolution of 640 by 480 pixels per image. This analog video signal 16 is received by video cassette recorder (VCR) 17 and stored on a removable magnetic tape cassette 21. After a video sequence is recorded, an operator can rewind the magnetic tape cassette 21 to desired time intervals and playback the recorded video. This results in the VCR 17 generating an RS-170 video signal 18 from the analog information stored on the magnetic tape cassette 21, allowing it to be displayed on a television monitor 19, showing the recorded image of the person 20.

The spatial resolution of a surveillance system can be determined by dividing the number of pixels along each respective axis by the width 14 and height 13 of the monitored region 12. As an example, the image size of 640 by 480 pixels divided by a typical monitored area of 32 feet wide by 24 feet high results in a spatial resolution of 20 pixels/ft. That is, each pixel corresponds to a 0.6 by 0.6 inch region in the monitored area 12.

FIG. 1B shows an example of an enlarged view of the face of the recorded image of the person 20, with a spatial resolution of 20 pixels/ft. The pixels that form this image are clearly visible, with each being displayed as a uniform shade of gray over the 0.6 by 0.6 inch region. FIG. 2B shows this same image, except that it is displayed with the pixels smoothly changing from one to another to remove the block-like appearance. Regardless of whether the image is displayed in the form of FIG. 2B or 2C, it is readily apparent that the image quality is insufficient to permit reliable identification of the individual.

FIGS. 2A through 2D further illustrate the relationship between spatial resolution and image interpretability. Each of these figures shows three images, a face, an automobile license plate, and a hand-to-hand exchange of money and drugs. These three examples represent important uses of surveillance video. The recognition of persons is needed to identify the perpetrators of criminal and terrorist acts, identify witnesses and victims, gather intelligence, document individual's involvement for judicial proceedings, and similar uses. While facial recognition is of prime importance for this purpose, visualization of other personal identifiers is also important, such as scars, tattoos, body shape, and clothing. Automobiles are frequently involved in illegal activity and registration records can lead to the identification of those involved. The vehicle license plate number is the single most important piece of information for this use, although determination of the make, model, and distinguishing marks, such as body damage and ornamentation, are also routinely used by law enforcement personnel. The monitoring of persons' hands is important to determine and document the type of activity being recorded in surveillance video, such as the exchange of money or illegal drugs, the brandishing of weapons, the removal or manipulation of property, and so on.

Figure 2A:
FIG. 2A shows three example images of interest in surveillance: a face, an automobile license plate, and the actions of persons' hands, displayed with a resolution of 160 pixels per foot.
Figure 2B:
FIGS. 2B, 2C, and 2D shows the same example images as in FIG. 2A, except displayed with resolutions of 80 pixels/ft., 40 pixels/ft., and 20 pixels/ft., respectively.
Figure 2C:
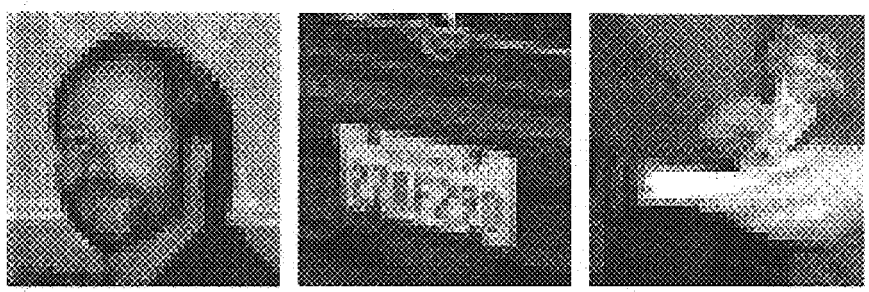
Figure 2D:
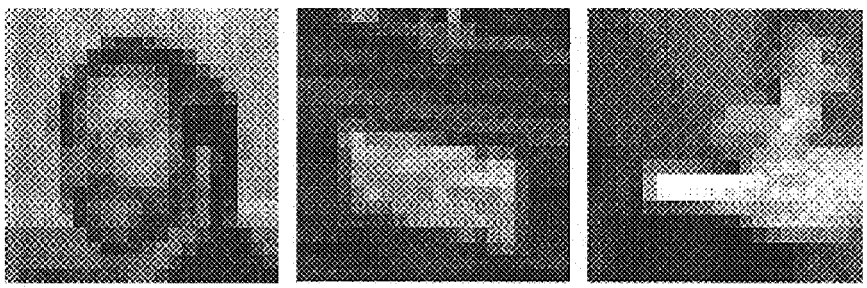

In FIG. 2A the three images are displayed with a spatial resolution of 160 pixels per foot. In FIGS. 2B, 2C, and 2D, the same three images are displayed with the reduced resolutions of 80 pixels/ft., 40 pixels/ft., and 20 pixels/ft., respectively. As can be appreciated by the inspection of FIG. 2B, a resolution of 80 pixels-per-foot is sufficient to reliability recognize faces, automobile license plates, and the actions of the hands. As demonstrated in FIGS. 2C and 2D, these key tasks can only be marginally carried out when the spatial image resolution is 40 pixels/ft., and cannot be reliably accomplished at 20 pixels/ft., respectively. FIG. 2A shows that increasing the resolution to 160 pixels/ft. noticeably improves the quality of the images; however, it does not significantly enhance the ability to perform the needed operations. In summary, FIGS. 2A through 2D demonstrate that effective surveillance video needs a minimum spatial resolution of approximately 80 pixels per foot, corresponding to a pixel size of approximately 0.15 by 0.15 inches.

Prior art surveillance systems using 640 by 480 pixels per image can only achieve this needed minimum spatial resolution when the monitored area 12 has a width 14 of eight feet or less (640 pixels/8 feet=80 pixels/ft.), and a height 13 of six feet or less (480 pixels/6 feet =80 pixels/ft.). This results in prior art systems being able to monitor small regions with an adequate resolution, such as an 8 by 6 foot field-of-view with a resolution of 80 pixels/ft. Alternatively, prior art systems can monitor large regions with inadequate resolution, such as a 40 by 30 foot field of view with a resolution of 16 pixels/ft. However, prior art systems cannot monitor large regions with an adequate spatial resolution.

Figure 3:
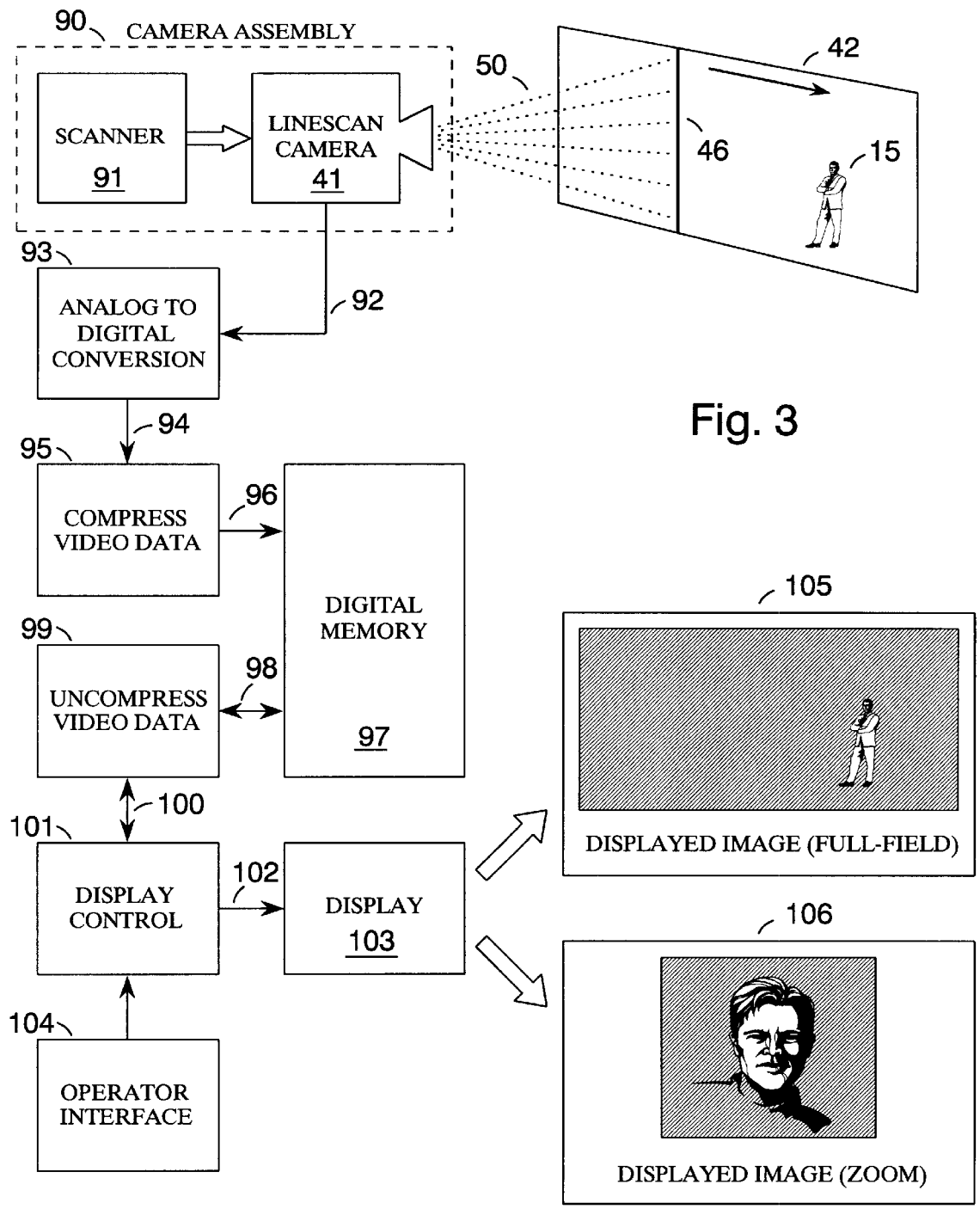
FIG. 3 is a schematic depiction in accordance with the inventive video surveillance system.

The Invention can be understood in part by referring to the schematic depiction in FIG. 3. The camera assembly 90 is formed from two components, a linescan camera 41 and a scanner 91. As known in the art, linescan cameras produce an electronic video signal corresponding to the light intensity profile along a single axis, that is, along a single line in space. These devices operate by using a lens to focus light from the line in space being viewed onto a linear array sensor, such as a charge coupled device (CCD). The operation of linescan cameras is well known in the art, with devices readily available from many commercial sources, for example: models SP-11 and CT-P1 from Dalsa, Inc., Waterloo, Ontario, Canada; models L120-2k and L240 from Basler Vision Technologies, GmbH, Ahrensburg, Germany; and models PL2048SP and PL-5000SF from Pulnex America, Inc., Sunnyvale, Calif. In the Invention, the linescan camera typically uses a CCD linear array containing 1024 to 8192 sensor elements. During each line sampling period, typically lasting 10 to 500 microseconds, light 50 being reflected or otherwise emitted from a narrow vertical line 46 in the monitored region 42 is captured by the linescan camera 41, which generates a corresponding electronic video signal 92. On each line readout, the electronic video signal 92 is composed of a temporal sequence of analog voltage levels, with each voltage level being proportional to the light detected by one of the 1024 to 8192 sensor elements. In this manner, the viewed line 46 in the monitored region 42 can be converted into an electronic signal 92 in a period of 10 to 500 microseconds, with a resolution of 1024 to 8192 pixels.

The scanner 91 is a mechanism that sweeps the viewed line 46 in the horizontal direction such that the viewed line 46 moves from one side of the monitored region 42 to the other side in a time period of typically 0.1 to 3 seconds. During a single image acquisition cycle, this results in the electronic signal 92 being composed of a series of line measurements, typically 2048 to 16384. At the completion of each image acquisition cycle, the camera assembly 90 resets itself and begins a subsequent image acquisition cycle, such that the electronic signal 92 consists of a continuous sequence of images. In other words, the camera assembly 90 is used to generate an analog video signal 92 consisting of a sequence of images of the monitored region 42, at a typical rate of one image each 0.1 to 3 seconds, with each image typically composed of 2048 to 16384 pixels in the horizontal direction, 1024 to 8192 pixels in the vertical direction, and having a typical aspect ratio of 2:1 to 10:1.

The analog video signal 92 is converted into a digital video signal 94 by an analog-to-digital conversion 93. This is accomplished by sampling the analog signal 92 at periodic intervals, and producing a digital (i.e., binary encoded) number representing the voltage amplitude at the sampling instant. In the preferred case, each digital number produced corresponds to the output of exactly one of the individual sensing elements in the linear array of the linescan camera 41. For example, in the case where the linear array contains 2048 individual sensing elements, the analog-to-digital conversion 94 produces a sequence of 2048 digital numbers per line, with each digital number being determined only by the output of the correspondence sensing element. That is, the analog-to-digital conversion is desired to be synchronous with the element-to-element readout of the linescan camera 41.

However, as is known in the art, the sampling of the analog-to-digital conversion may also be asynchronous with the pixel-to-pixel readout. This is accomplished by smoothing the analog output 92 by use of a low-pass filter, and then sampling the smoothed analog output with a certain number of samples per scan line. In this case, the number of samples per scan line only needs to be approximately the same as the number of sensing elements in the linear array of the linescan camera 41. For instance, if the linear array contains 2048 individual sensing elements, each line of the digital video signal 94 might contain, for example, only 2000 samples. In this case there is not a one-to-one correspondence between any one sample in the digital video signal 94 and any one sensing element in the linear array of the line scan camera 41.

Synchronous conversion achieves better resolution along the scan line than asynchronous conversion; however, it requires the additional complexity of matching the analog-to-digital conversion 94 with the element-to-element readout rate of the linescan camera 41. Commercial devices are available that combine synchronous analog-to-digital conversion electronics 93 in the same package as a linescan camera 41. These devices are often referred to as "digital linescan cameras," to distinguished them from "analog linescan cameras" that only produce an analog signal. The previously cited commercial products include both analog and digital linescan cameras. It is within the scope of the Invention to implement the linescan camera 41 and analog-to-digital conversion 93 either by the use of a digital linescan camera, or by the combined use of an analog linescan camera in conjunction with separate analog-to-digital conversion electronics.

As few as 8 bits can be used to represent each of the digitized pixel values; however, more bits are preferred to retain the high signal-to-noise ratio provided by the linescan camera 41. Prior art systems based on two-dimensional CCDs, or similar sensor arrays, have a typical signal-to-noise ratio of 50 dB. That is, the rms amplitude of the noise on the analog signal is approximately 300 times lower than the full scale signal level. An eight-bit digitization is required to capture the dynamic range of this signal. In other words, digital number 255 (the maximum value in 8 bits) is set to correspond with the full scale signal, making the rms noise of the analog signal slightly less than the step size of the digitization. As is known in the art, using more bits provides little or no additional information in this situation. If more bits are used, they only digitize noise.

An advantage of the Invention is the ability to use more bits per pixel than the prior art. Because of their simpler internal construction, linescan cameras can produce a higher signal-to-noise ratio than comparable two-dimensional CCTV cameras. As a typical example, a linescan camera used in the Invention may have a signal-to-noise ratio of 70 dB, indicating that the full scale signal is about 3000 times higher than the rms noise. This allows up to 12 bits to be effectively used in the digitization. An increased number of bits per pixel provides a more effective surveillance record, such as by extending the range of lighting the system can operate under, discriminating objects or regions that are very close in brightness level, and generally facilitating the ability of Digital Signal Processing techniques to enhance the images.

In accordance with the previous discussion, the digital video signal 94 is a sequence of images of the monitored region 42, at a typical rate of one image each 0.1 to 3 seconds, with each image typically composed of 2048 to 16384 pixels in the horizontal direction, 1024 to 8192 pixels in the vertical direction, having a typical aspect ratio of 2:1 to 10:1, and each pixel being typically represented by 8 to 12 bits. Within these typical imaging parameters of the system, the digital video signal 94 may have a data rate as low as a few megabytes per second, or as high as a few hundred megabytes per second. For the typical operation of a preferred embodiment with a frame rate of 0.5 seconds per image, with an image size of 5120 by 2048 pixels, and 8 bits per pixel, the resulting data rate of the digital video signal 94 is approximately 20 megabytes per second.

Digital video signal 94 is converted into a compressed digital video signal 96 through video data compression 95. As is known in the art, neighboring pixels within an image are highly correlated. That is, adjacent pixels frequently have a similar or identical value. Many different compression algorithms have been developed to remove the redundant information resulting from this correlation, allowing the digital image to be represented using a fewer number of bytes. One class of these algorithms allows the original image to be reconstructed or "uncompressed" without error. These are commonly called "lossless compression" algorithms, and include such techniques as: delta encoding, run-length encoding, LZW encoding, and Huffman encoding. Alternatively, "lossy compression" algorithms create data files that when uncompressed are only an approximation to the original image. Lossy algorithms include the techniques of transform compression, such as the Discrete Cosine Transform method, and wavelet compression. Since all acquired images inherently contain a certain amount of noise, if the errors generated by a lossy compression algorithm resemble a small amount of additional noise, the image is not degraded by any significant amount. This is important because lossy compression algorithms are far more efficient in compression than lossless algorithms.

As an example, a typical image of 640 by 480 pixels with 8 bits per pixel contains 640×480=307,200 bytes. When this image is represented in a GIF format, which uses lossless LZW compression, it will typically be reduced in size to about 200,000 bytes. When this image is represented in a JPEG format, which uses lossy transform compression in conjunction with other techniques, it will typically be reduced in size to 50,000 bytes, while maintaining good image quality. These compression algorithms and their performance levels are well known in the art, such as discussed in "The Scientist and Engineer's Guide to Digital Signal Processing" by Steven W. Smith, ISBN 0-9660176-3-3, California Technical Publishing, San Diego, Calif.

In addition to compression of the individual images, it is also possible to compress sequences of images by removing the correlation from image-to-image. In video sequences, including broadcast television and surveillance applications, only a fraction of the scene changes from one image to the next. This means that each pixel in one image is highly correlated with the corresponding pixels in subsequent images. By removing the redundant information contained in this image-to-image correlation, the video can be compressed far more than by techniques that only remove redundant information within individual images. The compression of digital video by using both within-the-frame compression and between-frame compression is well known in the art. The most common encoding format for this type of video compression is MPEG, which is widely used in consumer products, such as video sequences transmitted over the internet, and the distribution of motion pictures on digital video disks.

Nonetheless, there is an importance difference in performance between the use of MPEG and similar algorithms in broadcast television than in the Invention. When MPEG is used with broadcast television, between-frame compression achieves about the same level of data reduction as within-the-frame compression. As an example, each image in a television video sequence might be compressed by a factor of five using within-the-frame algorithms, and another factor of five using between-frame algorithms, for a total compression ratio of 25 to 1. However, when MPEG or similar algorithms are used in the inventive surveillance system, between-frame compression is ten to one-hundred times more effective at compressing the video data stream. This is because the characteristics of the digital video signal 94 are substantially different than the characteristics of broadcast television. While MPEG and similar algorithms are well known in the art of broadcast television, the unusually high compression ratios resulting from the unique nature of the digitized surveillance video is a key advantage of the Invention.

For purposes of explaining this difference, a video sequence can be divided into a "background" region and a "foreground" region. The background consists of those portions of the image that are not in motion, such as the walls, floor, furniture, sky, and so on. Conversely, the foreground consists of those regions in the image that are in motion, such as persons and vehicles. This distinction is important because the background has an extremely high correlation from image-to-image, and is therefore highly compressible using between-frame algorithms. Conversely, the foreground has little correlation from one image to the next because of the relative motion, and between-frame compression techniques are far less efficient. The ability of between-frame algorithms to provide higher compression ratios for the inventive system than for broadcast television is a result of several differences between the two types of video signals. First, broadcast television is, on the average, about two-thirds background and one-third foreground. This is because the persons and moving objects that appear in broadcast television are intentionally made to fill a substantial part of each image. For example, a typical field-of-view to show a person might be six feet wide. In comparison, the foreground in the Invention is much smaller than the background, typically being only a few percent of the image. As a typical example, a person might be viewed in a 40 foot wide field-of-view. The second reason is that broadcast television changes the viewing from one camera to another on an average of every 5 to 10 seconds, which effectively breaks all correlation in the images before and after the change. In contrast, the Invention is only required to compresses data from a single camera, thereby maintaining the image-to-image correlation of the background over the entire surveillance record. Third, in broadcast television the camera is frequently panned to follow moving persons, vehicles, and other objects, making the majority of the scene move uniformly across the image. In this case the entire scene is foreground, since there are no regions that remain constant from image-to-image. The Invention, in comparison, does not pan the image, and therefore does not suffer the same loss in compression effectiveness.

The advantage of the Invention in regards to data compression can be further explained by comparison to prior art systems using linescan cameras with nonrepetitive image data. As one case, aerial surveillance is commonly carried out by affixing a linescan camera to the underneath of an aircraft, situated such that the camera views a line on the earth perpendicular to the direction of flight. For example, an aerial surveillance system of this type might continuously acquire image data of a 2 mile wide region along a 500 mile long flight path. This and similar prior art systems can convert the video information to a digital form, compress the data by using within-the-frame algorithms, and store the compressed data in digital form. However, between-frame compression cannot be applied since the video data is not composed of successive images, much less successive images that are highly correlated. In comparison, the Invention's video signal is inherently a sequence of highly correlated images. This allows between-frame compression techniques to produce compression ratios that are far higher than can be achieved by the prior art systems.

Video data compression 95 consists of a between-frame compression algorithm carried out in dedicated hardware designed for this purpose, or a general purpose computer, such as a personal computer or microcontoller. In one preferred embodiment, the compression algorithm is an MPEG, or similar lossy algorithm, that utilizes a combination of both between-frame and within-the-frame compression.

In another preferred embodiment, the frame-to-frame compression algorithm is carried out by storing a first image in the sequence without reference to any other image in the sequence. Subsequent images in the sequence are then broken into small subregions, of a size typically 16 by 16 pixels to 512 by 512 pixels. As an example, an image size of 4096 by 2048 pixels is broken into 512 subregions each with a size of 128 by 128 pixels. Each of these subregions is then compared with the corresponding subregion in the first image for the purpose of determining if there has been change in the subregion between the two image acquisition times. This is carried out by counting how many of the pixels in the subregion have changed by more than a threshold amount. The threshold being empirically determined to be above the change expected from random image noise. If one or more of the pixels has changed by more than the threshold, the subregion is deemed to have changed between image acquisition times. Otherwise the subregion is deemed to have not changed. The image being compressed is then written to the compressed signal on a subregion-by-subregion basis. If the subregion is deemed to have changed, a single byte is written to the compressed file with a predefined value indicating that change has taken place, followed by all of the pixel values contained in the subregion. That is, between frame compression does not take place for this subregion. On the other hand, if the subregion is deemed to have not changed, only a single byte is written to the compressed signal, with a different predefined value indicating that no change has occurred. This results in very efficient compression since the entire subregion is being represented by a single byte. Uncompression of the image is accomplished by reconstructing each of the subregions, either from the exact pixels values that are stored, or by using the pixel values stored for the first image, as indicated by the value of the first byte stored for each subregion. It will also be recognized by those skilled in the art that each of the subregions that are written to the compressed signal may be individually compressed using within-the-frame algorithms, such as storing them in a GIF or JPEG format.

Depending on the amount of activity in the monitored region, video data compression 95 compresses the digital video stream 94 by a factor of 10 to 1000. For a typical operation of the preferred embodiments, using a frame rate of 0.5 seconds per image, an image size of 5120 by 2048 pixels, and 8 bits per pixel, the data rate of the digital video signal 94 is approximately 20 megabytes per second. Video data compression 95 converts the 20 megabyte per second digital video signal 94 into compressed digital video signal 96, having a typical data rate of 200 kilobytes per second, a compression of 100 to 1.

The compressed digital video signal 96 is continually stored in a large capacity digital memory 97. As is well known in the art, large capacity digital storage can be accomplished by using many different technologies, including: optical disks, digitally encoded magnetic tape, and solid state memory. It is within the scope of the Invention to use any of these technologies as the digital memory 97. In one preferred embodiment, digital memory 97 is a hard drive with a typical storage capacity of 1 to 500 gigabytes, or a combination of hard drives with lower capacities. Hard drives capable of this large capacity digital information storage are well known in the art, and routinely used for mass storage in personal computers. As an example of the operation of this preferred embodiment, the compressed digital video signal 94 has a typical data rate of 200 kilobytes per second and the digital memory 97 has a storage capacity of 20 gigabytes, resulting in a total recording time of more than one full day (20 gigabytes/200 kilobytes/second=100,000 seconds=27.8 hours). Increasing or decreasing the storage capacity of the hard drive provides a corresponding increase or decrease in the total recording time. When the digital memory 97 is full, old digital video data is overwritten with new digital video data, thus allowing the inventive system to continually record the most recent events in the monitored area without routine action on the part of a system operator.

In another preferred embodiment of the Invention, digital memory 97 consists of a removable digital storage media, such as an optical disk or digitally encoded magnetic tape. In this preferred embodiment, a system operator changes the removable media at periodic intervals, or when the memory is nearly full, thus allowing long term archiving of the surveillance record.

A primary use of the inventive system is unmanned surveillance, that is, the acquired video images are compressed and recorded in digital memory 97 for review at a later time. This later review is under the control and direction of a human operator. Display control 101 is a digital computer, such as a microprocessor, microcontroller, digital signal processor, or personal computer. In operation, display control 101 receives commands from the operator via the operator interface 104, allowing the operator to select portions of the surveillance record stored in digital memory 97 to be shown on display 103. Within the scope of the Invention, the operator interface 104 is any device that allows the operator to direct the action of the display control 101, such as a computer keyboard, mouse, joy stick, touchscreen, push-button array, and so on. Also within the scope of the Invention, the display 103 is any device capable of displaying an image to a human, such as a computer video monitor, television, helmet mounted display, direct optical projection onto the operator's retina, and similar devices capable of a horizontal image resolution of approximately 640 to 2000 pixels, and vertical image resolution of approximately 480 to 1500 pixels.

The preferred embodiment of the Invention allows the operator to review the surveillance record in a two step process. The first step involves viewing images or sequences of images in a full-field display, providing a general understanding of the overall events that occur in the monitored area. The second step involves viewing enlarged portions of individual images to identify persons, vehicles, actions of the hands, and so on. This operation of the preferred embodiment will now be explained in detail.

In the first step, the operator uses the operator interface 104 to direct the display control 101 to display sequential images that were acquired by the camera assembly 90. In this mode of operation, the display control 101 causes selected compressed images residing in the digital memory 97 to be recalled 98 and uncompressed 99 to form an uncompressed video signal 100, which is routed 102 to the display 103. Under selection by the operator via the operator interface 104, these recalled images can be displayed at the same rate and in the same order that they were acquired. Alternatively, as directed by the operator through the operator interface 104, they can be displayed in a different manner, such as fast forward, reverse, fast reverse, skipping segments that contain no motion, single images displayed in still motion, and so on.

In this first step of image inspection, the images are displayed full-field 105, that is, each acquired image of monitored region 42 is displayed in its full width on monitor 103. Since each of the acquired and recorded images has more pixels that the resolution of the display 103, this mode of operation cannot show all the information contained in the surveillance record. Rather, this mode subsamples each recorded image such that the larger number of pixels in each recorded image is mapped to the available number of pixels on the display 103. This type of mapping one image with a certain number of pixels to a display device with another number of pixels is well known in the art of digital computer graphics, and may involve the common techniques of nearest neighbor, bilinear interpolation, or similar methods. The important feature of this mode of operation is that the full-field of the image is displayed, but that the full information contained in the recorded image cannot be simultaneously displayed. This initial mode of image inspection allows the operator to understand the general events occurring in the monitored region, and to identify particular images, or short sequences of images, that need closer scrutiny. In the second step of image review, each of the above identified images, or short sequences of images, is examined by the operator in fine detail. This is accomplished by the operator instructing the display control 101, via the operator interface 104, to display a selected region of the image in an enlarged manner, i.e., a zoom image 106.

Figure 11:
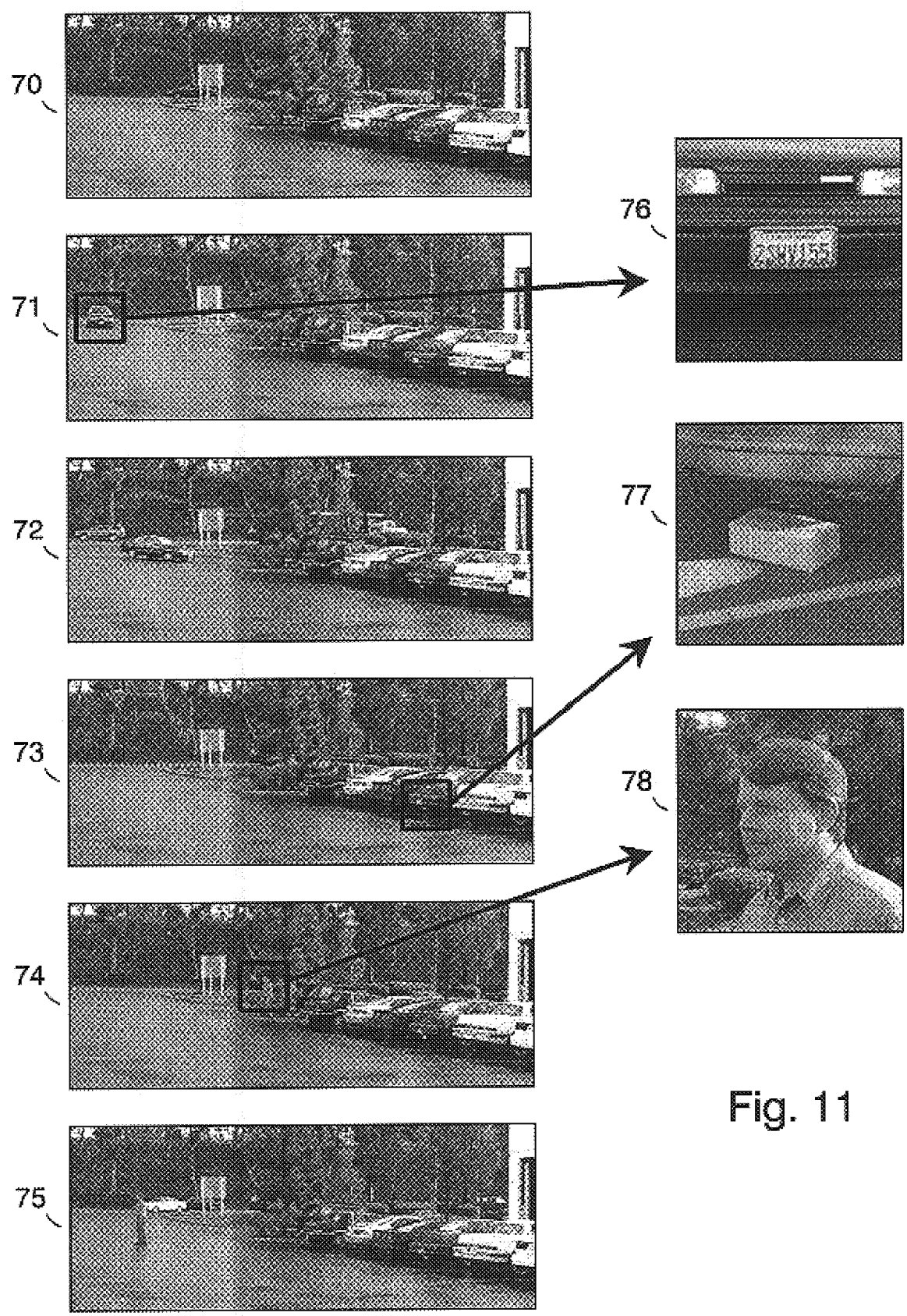
FIG. 11 shows a series of example images in accordance with the present video surveillance system, including both full-field and zoom views.

FIG. 11 explains this operation of the preferred embodiment in more detail. This figure shows six example full-field images 70–75 of a parking lot surveillance record. These images represent a monitored area of 80 by 25 feet, using 8000 by 2500 pixels, for a resolution of 100 pixels per foot, with images acquired at sequential one second intervals. The operator reviewing this surveillance record has the flexibility of viewing these full-field images in a variety of ways, as previously described, to identify the large scale events going on within the monitored region. These example images 70–75 show an automobile entering the driveway, a person walking across the parking lot, and a package left under one of the parked vehicles. However, the full information contained in the 8000 by 2500 pixel images cannot be displayed in the full-field mode, since video monitors are limited to a resolution of, typically, 800 by 600 pixels. In the full-field mode, each 8000 by 2500 pixel recorded image is remapped into an image of size 800 by 250 pixels, achieved by subsampling the image by a factor of ten in each direction. This 800 by 250 pixel image is then displayed on a computer monitor with a displayable resolution of 800 by 600 pixels, allowing the full 80 by 25 foot monitored region to be visualized by the operator. However, the displayed image has a resolution of only 10 pixels/ft., and is therefore limited in the information it can provide.

To invoke the zoom mode, the operator positions a mouse controlled cursor on the region of interest in the full-field image 105 and clicks the mouse button. This instructs the display control 101 to enlarge the region identified by the cursor and display it as a zoom image 106. In the example images of FIG. 11, this is shown by the zoom images of the vehicle's license plate 76, the package left under a parked vehicle 77, and the face of the pedestrian 78.

The zoom operation may involve one or more levels of magnification, with three zoom levels being describe here for clarity. A first level zoom mode is invoked by the operator clicking the mouse cursor on the face of the person's image. As an example, a 1600 by 1200 pixel subregion is extracted from the 8000 by 2500 pixel image in the location identified by the cursor, and then mapped into an 800 by 600 pixel image by subsampling. This 800 by 600 pixel subsampled image is then displayed on the 800 by 600 pixel video monitor. This first level zoom therefore enlarges the image by a factor of five over the full-field mode, and utilize the entire monitor screen to display a 16 by 12 foot section of the 80 by 25 foot monitored region. Since subsampling is required to display this first level zoom image, the displayed image still does not convey to the operator all the information contained in the recorded data. Further, this example zoom image has a resolution of only 50 pixels/ft., and is therefore not sufficient for many of the tasks needed in surveillance video.

A second level zoom mode is invoked by the operator clicking the mouse cursor on the face of the person's image in the first level zoom. As an example, an 800 by 600 pixel region is extracted from the 8000 by 2500 pixel stored image, as identified by the mouse curser's position, and displayed on the 800 by 600 pixel display. This results in the display of a 8 by 6 foot subregion of the monitored region 42, with the full recorded resolution of 100 pixels/ft. Since the extracted image is 800 by 600, it can be directly displayed on the 800 by 600 pixel computer monitor on a pixel-to-pixel basis without the need for subsampling. As previously described and shown in FIG. 2, the resolution of 100 pixels/ft. permits the identification of persons, the reading of license plates, the monitoring of hand actions, and other surveillance tasks.

A third level of zoom can be accessed by the operator clicking the mouse cursor on the face of the person's image in the second level zoom. As an example, a 200 by 150 pixel region can be extracted from the 8000 by 2500 pixel stored image, as identified by the mouse curser's position, and displayed on the 800 by 600 pixel display. This results in the display of a 2 by 1.5 foot subregion of the monitored region, with the full recorded resolution of 100 pixels/ft. Since the extracted image is 200 by 150 pixels, its display on the 800 by 600 pixel monitor requires a enlargement remapping. As in the second level of zoom, this third level of zoom allows the full resolution of the acquired image to be displayed on the computer monitor, but in an even more enlarged mode permitting easier viewing by the operator.

Although zoom levels having an integer magnification between levels have been used in this example, this is only to make the description of the Invention more clear. Within the scope of the Invention, any number of intermediate zoom levels can be employed, with any fractional or integer value of magnification between the zoom levels. What is most important is that the operator can view a full-field image display 105 to show the overall events in the monitored region 42, as well as a zoom image display 106 to view the recorded image in its full resolution. This solves a primary problem addressed by the Invention, the monitoring of large regions with the concurrent ability to view small subregions with high-resolution.

Figure 4:
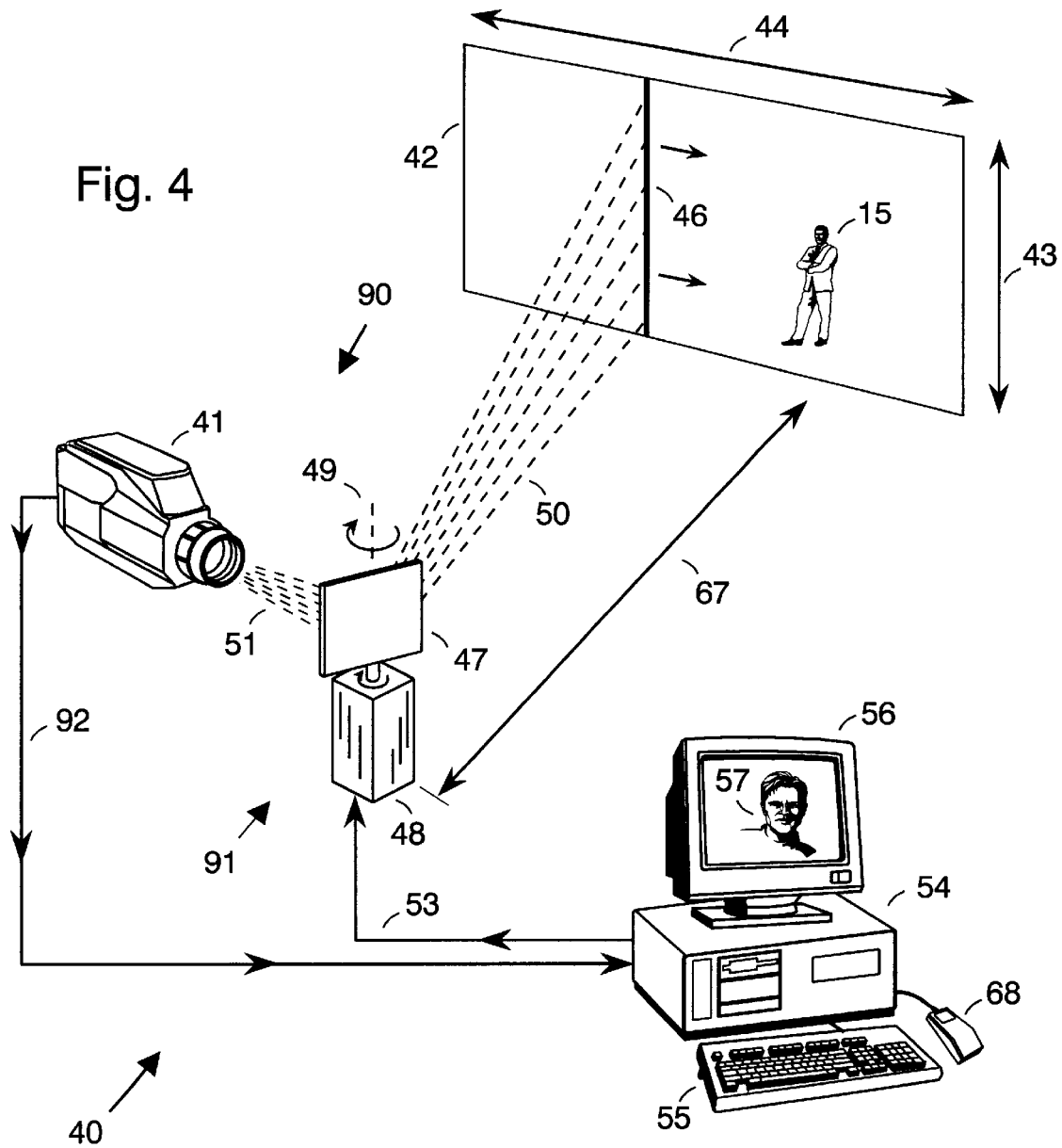
FIG. 4 is a schematic depiction of one embodiment of the inventive video surveillance system using a mirror attached to a rotational servo as a scanner, and a personal computer.
Figure 5A:
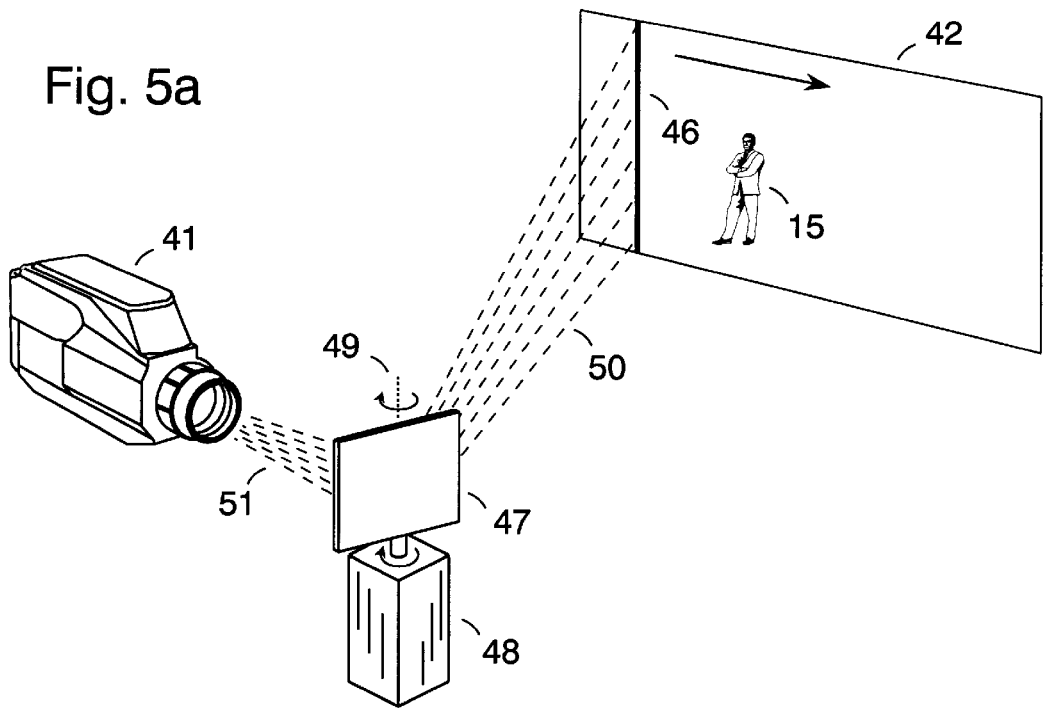
FIGS. 5A and 5B are schematic diagrams in accordance with the Invention, illustrating the operation of a rotational servo scanning mirror to sweep the line viewed by the linescan camera.
Figure 5B:
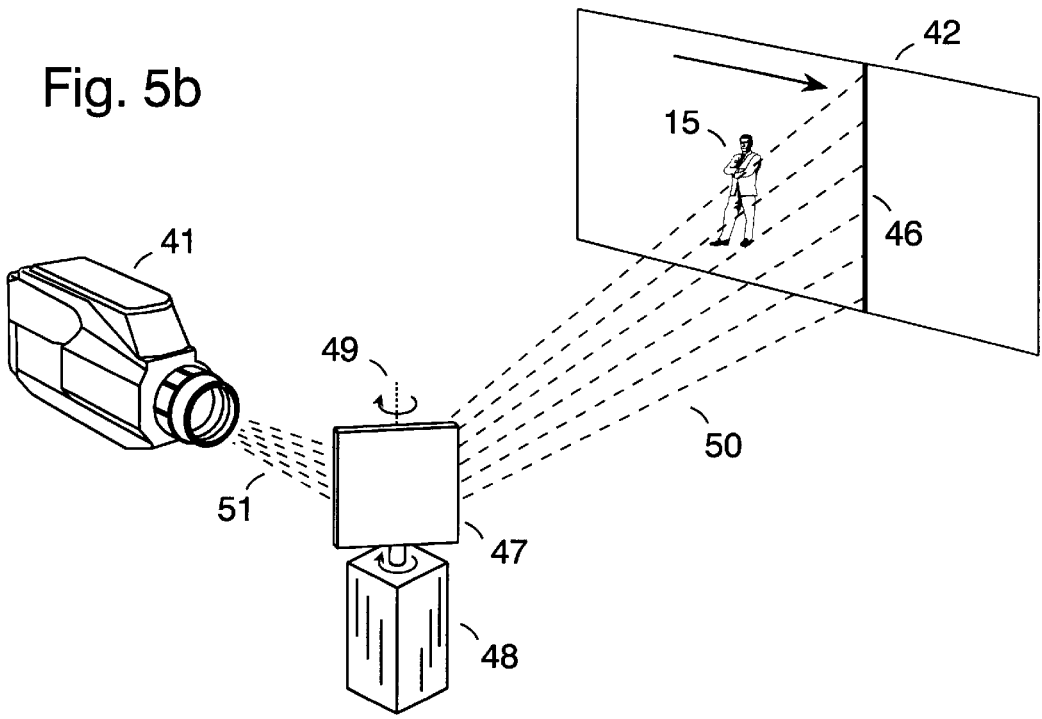

FIG. 4 shows a preferred embodiment of the Invention 40, with additional details of its operation provided in FIGS. 5a and 5b. A monitored region 42, has a width 44 and a height 43, at a distance 67 from the camera assembly 90. A person 15 is shown located within the monitored area 44, representing persons, objects, and similar items that the system is designed to keep under video surveillance. The width of the surveillance area 44 is approximately 20 to 100 feet, the height is approximately 10 to 30 feet, and the distance 67 is approximately 10 to 100 feet from the camera assembly, as appropriate for the particular location that the system is being deployed in. A linescan camera 41 views a vertical line 46 in the monitored region 44, through a mirror 47. That is, light 50 being emitted or reflected from viewed vertical line 46, is reflected from mirror 47, forming reflected light 51, which is received and detected by linescan camera 41. The linescan camera in this preferred embodiment is any one of the previously cited commercial products, or an equivalent device, having a sufficient number of pixels to provide a resolution of at least 40 to 80 pixels/ft. in the vertical direction. That is, the number of pixels in the linescan camera 41, divided by the number of feet in the vertical dimension 43 is greater than 40 to 80 pixels/ft. As a typical case, the linescan camera 41 would have 2000 pixels to cover a height 43 of 20 feet, resulting in a vertical resolution of 100 pixels/ft.

Mirror 47 is mounted on a rotational servo 48 with an axis of rotation 49. As the rotational servo 48 changes the angular position of the mirror, such as shown by the difference between FIGS. 5a and 5b, the viewed vertical line 46 sweeps across the monitored region 42. This scanning cycle requires approximately 0.1 to 3 seconds, with a typical value of 0.5 seconds for the preferred embodiment. During this scanning interval, the linescan camera 41 produces an analog video signal 92 representing the light being emitted or reflected from vertical line 46 as it moves across the monitored region 42. The analog video signal 92 is routed into personal computer 54, which contains the hardware and software to implement the functions of analog-to-digital conversion 93, video data compression 95, digital memory 97, video data uncompression 99, and display control 101. The operator interface 104 is provided by the personal computer keyboard 55 and mouse 68. The display 103 is provided by the personal computer video monitor 56, displaying an image 57, capable of showing either a full-field view 105 or zoom view 106.

The scanner 91 consists of a rotational servo 48 rotating mirror 47 back-and-forth around a vertical axis 49. In the preferred embodiment, this is a galvanometer servo with positioning controlled by the personal computer 54 through a control connection 53. Galvanometer servos of this type are well known in the art, and commercial products are manufactured by several companies, for example: model G300 from General Scanning, Inc., Watertown, Mass., or model 6880 from Cambridge Technology, Inc., Cambridge, Mass. In this preferred embodiment, the mirror 47 is approximately 2 by 2 inches in size, with the scanner 91 (mirror 47 and galvanometer 48) mounted as near the lens of the linescan camera 41 as possible, typically 1–2 inches. For typical operation of the preferred embodiment, the monitored area 42 may have a width 44 of 80 feet, and be located at a distance 67 of 60 feet from the camera assembly 90. To achieve the scanning of viewed line 46 across the monitored region 42, the rotational servo 48 rotates the mirror 47 through a total angle of $\arctan((w/2)/d)$, where w is the width 44 and d is the distance 67. In this typical operation of the preferred embodiment, the total angle of rotation is $\arctan((80/2)/60)=33.7$ degrees.

At the completion of the typically 0.5 second scanning cycle, the rotational servo 48 moves mirror 47 back to its starting position at a rotational velocity typically 10 times that of the rotational velocity during scanning. That is, if the scanning rotation requires a time of 0.5 seconds, the preferred rotational reset time is approximately 50 milliseconds. In this embodiment, images would be acquired only when the mirror 47 is moving in one direction, which can be referred to as unidirectional scanning. In another preferred embodiment, images are acquired when the mirror 47 rotates in one direction over a typically 0.5 second scanning cycle, and images are also acquired as the mirror moves in the reverse direction, also over a second 0.5 second scanning cycle. This embodiment can be referred to as bidirectional scanning.

The ratio of the viewed height 46 to the distance 67 is approximately equal to the height of the image sensor inside of the linescan camera 41, divided by the focal length of the camera lens. In a typical operation of the preferred embodiment where the height of the viewed area 46 is 20 feet, the distance 67 is 60 feet, and the height of the image sensor is 20 mm, the focal length of the required lens is 60 mm. To adjust the viewed height 46 to 40 feet, for example, a 30 mm lens would be used. In this manner, the viewed height 43 can be matched to the particular application by selecting a camera lens of the appropriate focal length. Alternatively, an adjustable focal length camera lens allows the viewed height 43 to be matched to the particular area being monitored without having to change lenses. The adjustment of the viewed height 43 being achieved by adjusting the focal length of the lens, either by manual means, or by using a lens that employs a motor to move optical elements within the lens assembly. This motorized adjustment having the advantage that the viewed height 43 can be changed remotely by electrical signals, without requiring a technician to access the mounted camera assembly.

Regardless of the lens used, the number of pixels spread along the vertical height 43 is determined by the number of individual sensor cells in the CCD or other light sensor. Within the present Invention, the number of sensor cells must be sufficient to provide a vertical resolution of at least 40 to 80 pixels/ft., taken in conjunction with the vertical height 43 of the particular viewing area. For example, a particular viewing area may have a vertical height 43 of 20 feet, and a desired resolution of 60 pixels/ft., requiring 1200 sensor cells in the linescan camera. As a further typical example, another viewing area may have a requirement for a vertical height 43 of 50 feet, and a desired resolution of 100 pixels/ft., requiring 5000 sensor cells in the linescan camera.

Whereas the vertical image height and resolution are set in the manner describe above, the horizontal imaging parameters are determined by the camera line rate and the mirror rotation. It is generally preferred that the horizonal and vertical resolutions be approximately equal. Therefore the ratio of the horizontal width 44 to the vertical height 43 will be the same as the ratio of the number of pixels in the horizontal direction to the number of pixels in the vertical direction. As an example, a height 43 of 25 feet, and a width 44 of 80 feet uses a linescan camera 41 with 2048 sensor cells. The number of pixels in the horizontal direction is therefore: 2048 pixels times 80 feet divided by 25 feet, or 6554 pixels, and the resolution in both the vertical and horizontal directions is approximately 82 pixels/ft. The rotational rate of rotational servo 48 is determined by dividing the number of pixels in the image by the camera data rate. For example, 2048 times 6554 pixels divided by a typical readout rate of 20 million per second equals a cycle time of 0.67 seconds.

It can be appreciated from the previous description that the horizontal width 44 can be adjusted independently from the vertical height 43. This is a significant advantage of the Invention over the prior art, allowing the Invention to match the aspect ratio of the acquired images to the particular area being viewed. As a typical example, a viewed area of 80 by 25 feet is recorded with a grid of 6554 by 2048 pixels, and a cycle time of 0.67 seconds. By adjusting the rotation of the servo, this could be changed to cover, as a typical example, a viewed area of 40 feet wide by 25 feet high. This results in the smaller monitored area being recorded with a grid of 3277 pixels by 2048 pixels. This matching of the aspect ratio of the recorded images with the aspect ratio of the particular region to be monitored provides the most efficient use of the available spatial resolution and memory storage capacity. In one preferred embodiment of the Invention, the linescan camera 41 employs a motorized adjustable focal length lens under control of the personal computer 54, in addition to the rotational servo 48 being under control of the personal computer 54. This embodiment allows the vertical height 43 and the horizontal width 44 to be independently and remotely adjusted from the computer, as needed to match the region being monitored.

Figure 6:
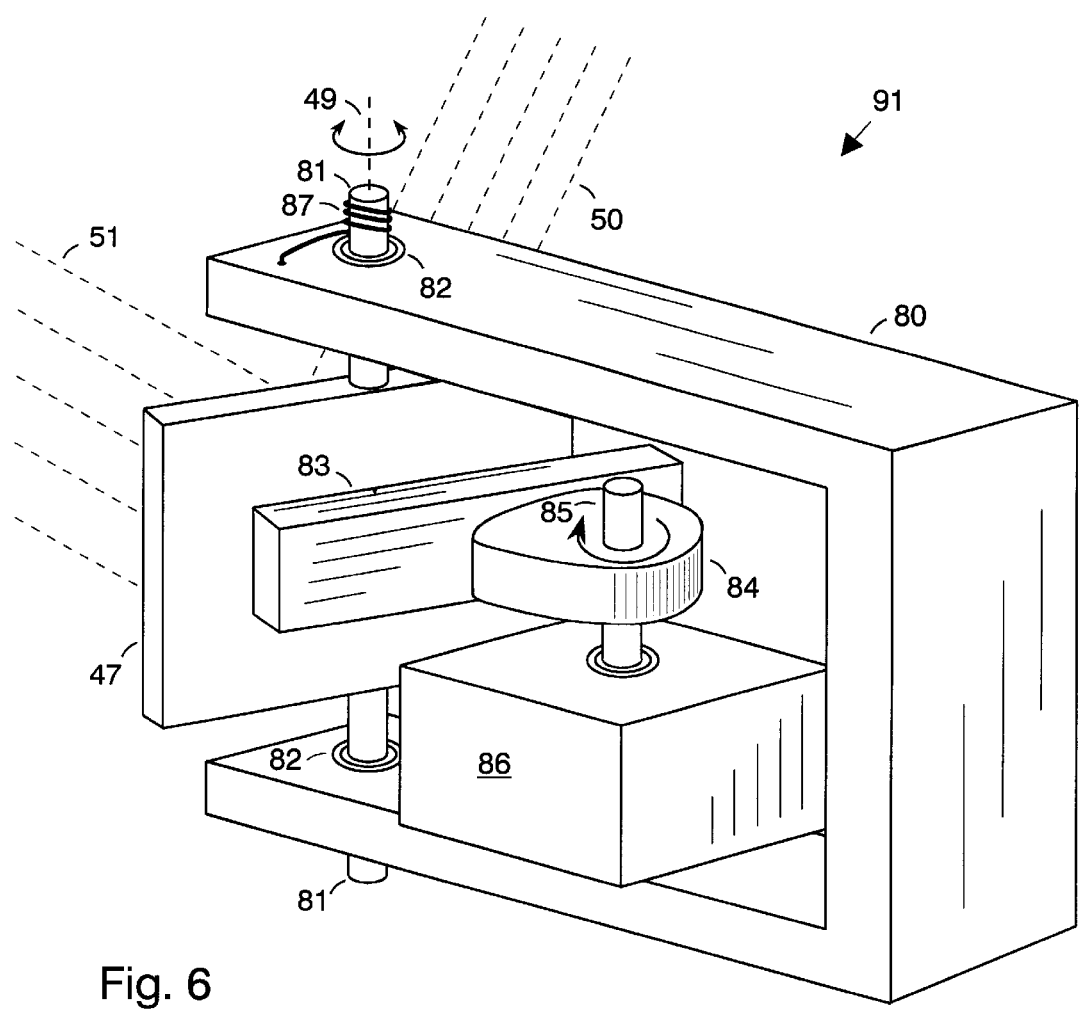
FIG. 6 is a schematic depiction of another embodiment of the scanning assembly using a rotating mechanical cam and mirror.

FIG. 6 shows another preferred embodiment of the scanner 91 used to rotate the mirror 47 in a back-and-forth motion around axis 49. The mirror 47 is attached to a rotational shaft 81 which is affixed to a C-shaped mounting bracket 80 by rotational bearings 82. A gear-motor 86 rotates shaft 85, with an attached cam 84, at approximately 0.1 to 3 rotations-per-second. A cam-arm 83 is affixed to mirror 47, and is pressed into continual contact with the cam 84 by the force of spring assembly 87. As the cam 84 rotates, the cam-arm 83 follows the shape of the cam 84, thereby moving the mirror 47 in the required oscillatory manner. As is known the art of cam design, the shape of cam 84 can be such to provide a uniform rotational velocity in one direction and a faster return in the other direction for use in unidirectional scanning. Alternatively, a uniform rotational velocity can be provided in both directions thereby permitting bidirectional scanning.

Figure 7:
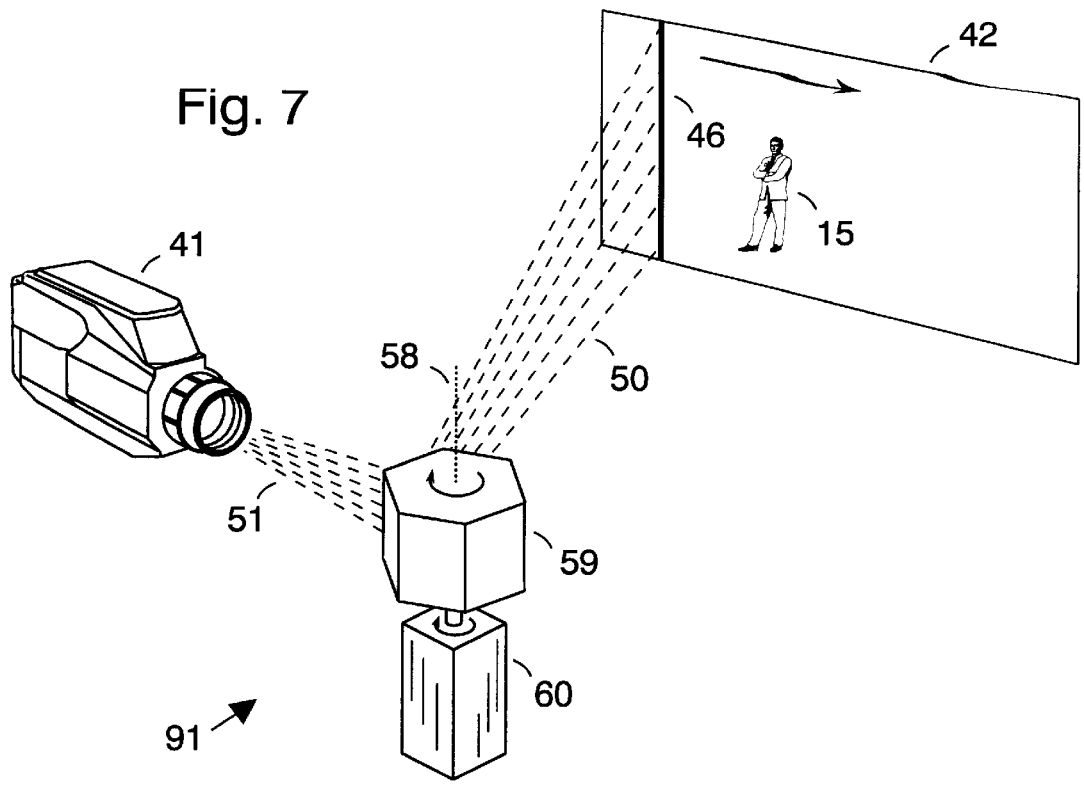
FIG. 7 is a schematic depiction of yet another embodiment of the scanning assembly using a rotating multi-sided polygon mirror.

FIG. 7 shows another preferred embodiment of the scanner 91 where a polygon mirror 59 is affixed to the shaft of a gear-motor 60, rotating around an axis 58 at approximately 0.1/N to 3/N cycles per second, where N is number of faces on the polygon mirror 59. In FIG. 7 the number of faces on the polygon mirror 59 is six; however, it can be appreciated by those skilled in the art that this is for illustrative purposes only, and the number of faces can widely vary. For example, the polygon mirror can have two rectangular faces (a double-sided flat mirror), three rectangular faces (an triangular shape when viewed from above), four rectangular faces (a square shape when viewed from above), and so on. As the polygon mirror 59 completes each revolution, the viewed vertical line 46 scans across the monitored region 42 the same number of times as there are faces on the polygon mirror 59.

Figure 8:
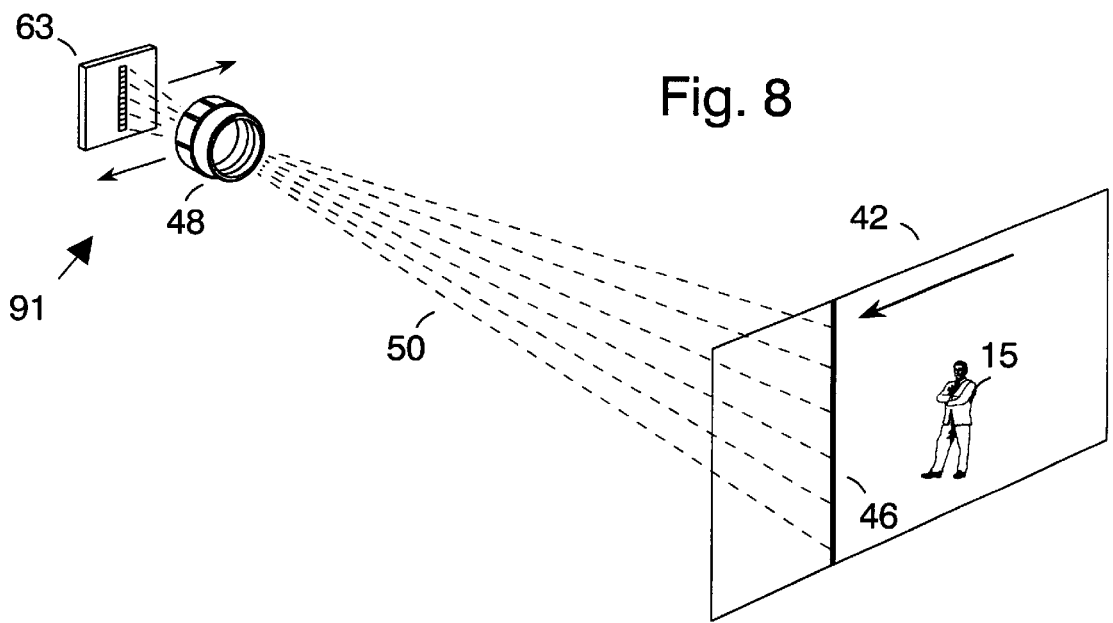
FIG. 8 is a schematic depiction of still another embodiment of the scanning assembly using a relative linear motion between the linear array light sensor and the camera lens.

FIG. 8 shows another preferred embodiment of the scanner 91 where the scanning action is accomplished by a relative linear movement between the camera lens 48 and the optical sensor 63 within the linescan camera. This relative motion can be achieved by moving the optical sensor 63 while keeping the camera lens 48 stationary; moving the camera lens 48 while keeping the optical sensor 63 stationary, or a combination of the two. In each of these cases the optical sensor views a vertical line 46 in the monitored region 42, with the horizontal position of the vertical line scanning across the monitored region 42 as a result of the relative linear motion. As a typical example of the operation of this preferred embodiment, the monitored region may have an aspect ratio of 3 (i.e., the width of the monitored region 42 is three times its height), and the optical sensor may have a height of 20 mm. The relative motion between the optical sensor 62 and the lens 48 would therefore be 60 mm, such that the ratio of the relative motion distance to the height of the optical sensor 63 is the same as the aspect ratio of the monitored region. Mechanisms suitable for providing the relative linear motion of this embodiment are well known in the art, such as a motor driven lead-screw in conjunction with linear bearings.

Figure 9:
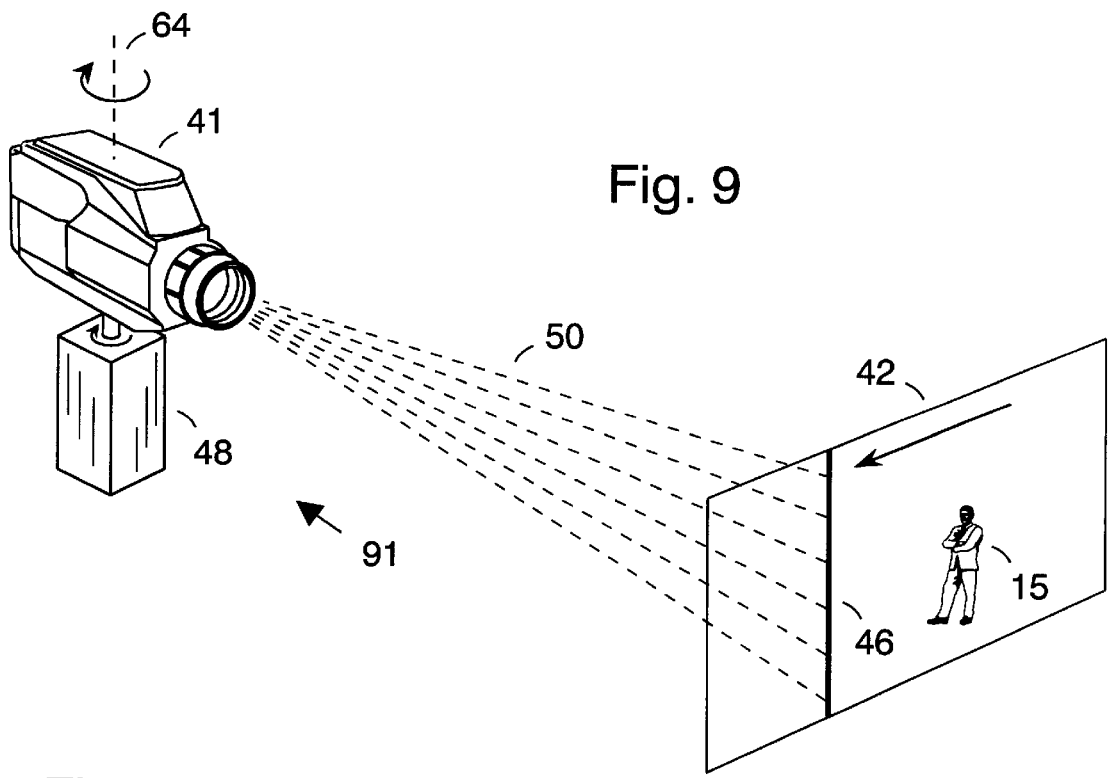
FIG. 9 is a schematic depiction of yet still another embodiment of the scanning assembly where the linescan camera is rotated back-and-forth around a vertical axis.

FIG. 9 shows yet another preferred embodiment of the scanner 91 where the linescan camera 41 is affixed to the shaft of an oscillatory rotational servo 48. The horizontal scanning action in this embodiment is produced by rotating the linescan camera 41 in a back-and-forth motion around a vertical axis 64. The image acquisition can be unidirectional or bidirectional, however, the bidirectional mode is preferred because it eliminates the need for a rapid reset movement that can place excessive force on the linescan camera. That is, in this preferred embodiment, the linescan camera 41 is rotated at a constant rate in one direction to acquire an image, and at the same constant rate in the opposite direction to acquire the next image, where each of the rotational motions last approximately 0.1 to 3 seconds.

Figure 10:
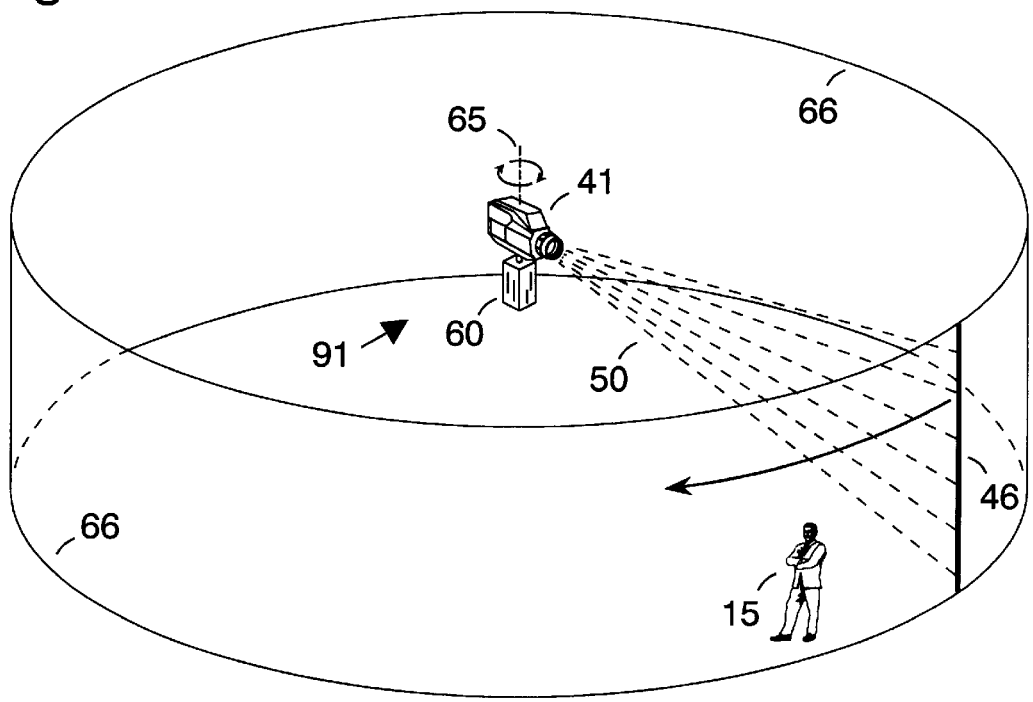
FIG. 10 is a schematic depiction of yet another embodiment of the scanning assembly where the linescan camera is rotated 360 degrees around a vertical axis.

FIG. 10 shows still another preferred embodiment of the scanner 91, where the linescan camera 41 is affixed to the shaft of a gear-motor, such that it is continuously rotated 360 degrees around an axis 65. In this embodiment, the monitored area 66 is the surface of a cylinder extending on all sides of the camera assembly. Electrical connections to the linescan camera 41 for power and data are provided by slip rings, allowing for the continuous rotational motion. As an example of the typical operation of this embodiment, the height of the monitored region 66 may be 20 feet, at a distance of 60 feet from the camera assembly. Therefore the circumference of the monitored region is 377 feet, resulting in an effective aspect ratio of 377/20=18.85. For a linescan camera 41 having 2000 sensor cells, the image acquired during each revolution would be 37700 by 2000 pixels, corresponding to an image resolution of 100 pixels/ft. The rotational rate of the camera is determined by the total number of pixels in the image divided by the data transfer rate of the linescan camera 41. As a typical example, the 37700 times 2000 pixels in the image with a data transfer rate of 40 million pixels per second results in a rotational rate of one rotation each 1.885 seconds. This embodiment is of particular use in the surveillance of large areas, such as parking lots, casino gaming facilities, convention halls, an so on.

In another preferred embodiment of the Invention, in conjunction with any of the above described scanning methods, the linescan camera 41 can be operating in a Time Delay Integration (TDI) mode. The TDI mode of operation is known in the art and commercially available in products such as models CL-E2 (unidirectional scanning) or CL-F2 (bidirectional scanning) from Dalsa, Inc., Waterloo, Ontario. A TDI linescan camera contains 2 to 256 vertical columns of sensor cells, as opposed to the single vertical column of sensor cells in a non-TDI linescan camera. The analog signals that are detected by these multiple vertical columns are shifted horizontally from column-to-column at a rate coordinated with the scanning of the Invention. As is known in the art, this provides the same function as a non-TDI linescan camera, but with an improvement in light sensitivity corresponding to the number of columns employed. As an example, a 96 column TDI linescan camera provides the same video output signal as a non-TDI camera, but can operate with 96 times more light sensitivity. In typical TDI cameras the spacing between columns is the same as the spacing between pixels in the vertical direction. This means that the coordination between the horizontal shifting in the TDI camera and the scanning of the Invention is achieved by matching the horizontal and vertical resolution. As a typical example, a monitored region is 80 feet by 20 feet, and the TDI linescan camera has 2000 sensing cells in the vertical direction. The TDI coordination is satisfied when 8000 pixels are acquired in the horizontal direction, thus providing a resolution of 100 pixels/ft. in both the vertical and horizontal directions. Taking this example further, if the TDI linescan camera has a line rate of 10000 lines per second, the scanner of the Invention would sweep the viewed vertical line across the 80 foot wide monitored region in 0.8 seconds. The ability of the present Invention to use the TDI mode of operation is important because surveillance systems frequently need to operate in low-light environments.

Having thus given the description of the preferred embodiments, it can be appreciated by those skilled in the art that many modifications are possible for particular applications and are within the scope of the present Invention. Some of these modifications are described as follows.

Within the scope of the Invention, the linescan camera can be selected or modified to view particular wavelengths or intensities of electromagnetic radiation. This includes the use of light amplifiers to provide operation in low-light environments, infrared sensitive sensors for operation in total optical darkness, and color linescan cameras that simultaneously capture images in the red, green, and blue spectral bands.

Other modifications within the scope of the Invention include means for the automatic adjustment of the system's operating parameters, as known in the art. This includes the automatic focusing of the camera lens, based on optimizing the sharpness of the acquired images; automatic adjustment of the camera lens iris, based on the brightness of the acquired images; and automatic gain control of the analog signal before digitization, also based on the brightness of the acquired images.

Further modifications within the scope of the Invention employ the use of standard computer devices and software, such as: copying portions of the surveillance record to transportable and/or archive media, such as floppy disks, optical disks, or digital magnetic tape; printing portions of the surveillance record, such as zoom images of faces, on laser or similar printers; and converting portions of the recorded surveillance record to other formats, such as TIFF or GIF images, or RS 170 analog signals.

Still other modifications within the scope of the Invention include operational features that allow operators to extract information from the video data. An example of this modification is providing a real-time display of the images being generated from the camera assembly. As a further example, providing for the viewing of a selected zoom view in normal play, fast forward, reverse, fast reverse or single image modes. As still another example, providing for digital image processing functions that can be applied to individual images or sequences of images, under the direction of an operator. Digital image processing functions of this type are well known in the art, including brightness and contrast adjustment, grayscale transforms such as histogram equalization and related adaptive methods, linear and nonlinear filtering, segmentation algorithms, and facial recognition methods. Algorithms of this type are describe in the previously cited book by Smith.

Still additional modifications within the scope of the Invention include the combination of multiple camera assemblies. That is, the digital video signals from two or more camera assemblies are received and processed by the same digital video compression, digital storage, uncompression, display control, and operator interface. A related modification is to combine a conventional CCTV camera with the Invention, such that the output of the CCTV camera is digitized, compressed, and stored in the digital memory. In this modification, the inventive camera assembly provides the capability of monitoring large regions while simultaneously providing high resolution, while the CCTV camera additionally provides a high temporal resolution record (30 frames per second), but at low resolution. Although particular embodiments of the Invention have been described in detail for the purpose of illustration, various other modifications may be made without departing from the spirit and scope of the Invention. Accordingly, the Invention is not to be limited except as by the appended claims.

I claim:

1. A high-resolution video surveillance system, comprising:

a linescan camera, said linescan camera comprising an linear array sensor producing an analog video signal representative of a viewed line in a monitored region;

a scanner for sweeping said viewed line across said monitored region in a direction substantially perpendicular to said viewed line, said scanner operating with a mechanical motion;

an analog-to-digital converter for converting said analog video signal into a first digital video signal;

a digital data compressor for converting said first digital video signal into a compressed digital video signal;

a digital memory for holding said compressed digital video signal;

a digital data uncompressor for converting said compressed digital video signal into an uncompressed digital video signal, wherein said uncompressed digital video signal is substantially similar to said first digital video signal;

a video display for presenting images to a human operator, said video display having a spatial resolution substantially lower than said uncompressed digital video signal;

an operator interface whereby said human operator can select a subset of said uncompressed digital video signal; and a video display control for routing said subset of said uncompressed digital video signal to said video display.

2. A high-resolution video surveillance system as claimed in claim 1, wherein the linescan camera and the analog-to-digital converter are a digital linescan camera.

3. A high-resolution video surveillance system as claimed in claim 1, wherein the linescan camera operates in a time delay integration mode.

4. A high-resolution video surveillance system as claimed in claim 2, wherein the linescan camera operates in a time delay integration mode.

5. A high-resolution video surveillance system as claimed in claim 1, wherein the scanner comprises a movable mirror.

6. A high-resolution video surveillance system as claimed in claim 3, wherein the scanner comprises a movable mirror.

7. A high-resolution video surveillance system as claimed in claim 1, wherein the scanner comprises a mirror mounted on a galvanometer servo.

8. A high-resolution video surveillance system as claimed in claim 2, wherein the scanner comprises a mirror mounted on a galvanometer servo.

9. A high-resolution video surveillance system as claimed in claim 3, wherein the scanner comprises a mirror mounted on a galvanometer servo.

10. A high-resolution video surveillance system as claimed in claim 1, wherein the scanner comprises a mirror moved in a back-and-forth motion by a rotating cam.

11. A high-resolution video surveillance system as claimed in claim 1, wherein the scanner comprises a rotating polygon mirror.

12. A high-resolution video surveillance system as claimed in claim 1, wherein the linescan camera further comprises a camera lens, and the scanner provides a relative linear motion between the linear array sensor and said camera lens.

13. A high-resolution video surveillance system as claimed in claim 1, wherein the scanner comprises a rotational servo, said rotational servo rotating the linescan camera.

14. A high-resolution video surveillance system as claimed in claim 1, wherein the digital data compressor reduces the correlation from image-to-image.

15. A high-resolution video surveillance system as claimed in claim 1, wherein the digital data compressor comprises an MPEG algorithm.

16. A high-resolution video surveillance system as claimed in claim 1, wherein the digital memory is a computer hard drive.

17. A high-resolution video surveillance system as claimed in claim 1, wherein the digital memory comprises a removable digital storage media.

18. A high-resolution video surveillance system as claimed in claim 1, wherein the video display, the operator interface and the video display control are a personal computer.

19. A high-resolution video surveillance system as claimed in claim 1, wherein the operator interface comprises a computer mouse.

20. A high-resolution video surveillance system as claimed in claim 1, wherein the spatial scaling between the first digital video signal and the monitored region is greater than 40 pixels per foot.

21. A method for inspecting subregions in a surveillance video recording, comprising the steps of:

operating a linescan camera to view a vertical line in an area under surveillance;

horizontally scanning said vertical line over said area under surveillance to produce a video signal, said video signal comprising a temporal sequence of full-field images, said horizontally scanning comprising a mechanical motion;

converting said video signal into a digital data stream;

compressing said digital data stream to a substantially lower data rate;

storing said digital data stream in a digital memory;

recalling from said digital memory one of the full-field images;

converting the recalled full-field image to a lower spatial resolution;

displaying the lower resolution full-field image;

selecting a region of the displayed full-field image;

displaying the selected region in a zoom display wherein the full information contained in the selected region is presented to a human operator.

22. A method for inspecting subregions in a surveillance video recording as claimed in claim 21, wherein the video signal is converted into the digital data stream synchronously with the readout of the linescan camera.

23. A method for inspecting subregions in a surveillance video recording as claimed in claim 21, wherein the linescan camera operates in a time delay integration mode.

24. A method for inspecting subregions in a surveillance video recording as claimed in claim 21, wherein the step of horizontally scanning further comprises rotating a mirror.

25. A method for inspecting subregions in a surveillance video recording as claimed in claim 21, wherein the step of horizontally scanning further comprises rotating the linescan camera.

26. A method for inspecting subregions in a surveillance video recording as claimed in claim 21, comprising the further step of adjusting the horizontal scanning to substantially match the width of the monitored region.

27. A method for inspecting subregions in a surveillance video recording as claimed in claim 21, wherein the compression of the digital data stream comprises reducing the redundancy of information between the full-field images.

28. A method for inspecting subregions in a surveillance video recording as claimed in claim 21, wherein the compression of the digital data stream comprises an MPEG algorithm.

29. A method for inspecting subregions in a surveillance video recording as claimed in claim 21, wherein the steps of displaying the lower resolution full-field image, selecting a region of the displayed full-field image, and displaying the selected region are carried out on a personal computer.

30. A method for inspecting subregions in a surveillance video recording as claimed in claim 21, wherein the step of selecting a region comprises using a computer pointing device to position a cursor on the displayed lower resolution full-field image.

31. A method for inspecting subregions in a surveillance video recording as claimed in claim 21, wherein the selected region represents the face of a person.

32. A method for inspecting subregions in a surveillance video recording as claimed in claim 21, wherein the full-field images have a large aspect ratio.

33. An apparatus for displaying a subregion of an area being monitored by video surveillance, comprising:

linescan camera means for producing an analog video signal of a viewed line in a monitored region;

scanning means for sweeping said viewed line across said monitored region in a direction substantially perpendicular to said viewed line, said scanning means operating with a mechanical motion;

analog-to-digital conversion means for converting said analog video signal into a digital video signal, said digital video signal having a data rate, said digital video signal having an image size that is expressible as a number of pixels along the horizontal dimension;

compression means for reducing said data rate;

digital memory means for storing said digital video signal;

uncompression means for substantially restoring said digital video signal to its precompression form;

display means for presenting images to a human operator, said display means having a display size that is expressible as a number of pixels along the horizontal dimension, said display size being substantially smaller than said image size;

operator interface means whereby said human operator can select a region of said digital video signal, said region having a region size that is expressible as a number of pixels along the horizontal dimension, said region size being substantially equal to said display size;

display control means for routing said region to said display means.

34. An apparatus for displaying a subregion of an area being monitored by video surveillance as claimed in claim 33, wherein the linescan camera means and the analog-to-digital conversion means are a digital linescan camera.

35. An apparatus for displaying a subregion of an area being monitored by video surveillance as claimed in claim 33, wherein the linescan camera means operates in a time delay integration mode.

36. An apparatus for displaying a subregion of an area being monitored by video surveillance as claimed in claim 34, wherein the linescan camera means operates in a time delay integration mode.

37. An apparatus for displaying a subregion of an area being monitored by video surveillance as claimed in claim 33, wherein the scanning means comprises a movable mirror.

38. An apparatus for displaying a subregion of an area being monitored by video surveillance as claimed in claim 33, wherein the scanning means comprises a movable mirror mounted on a galvanometer servo.

39. An apparatus for displaying a subregion of an area being monitored by video surveillance as claimed in claim 33, wherein the display means, the operator interface means, and the display control means are a personal computer.

40. An apparatus for displaying a subregion of an area being monitored by video surveillance as claimed in claim 33, wherein the linescan camera means operates in the visible portion of the optical spectrum.

\* \* \* \* \*